Nov. 8, 1960 D. H. APGAR 2,959,283

DATA COMPARING DEVICE

Filed Aug. 31, 1954 7 Sheets-Sheet 1

INVENTOR.
DONALD H. APGAR

BY

J. Tancin Jr.

ATTORNEY

DATA COMPARING DEVICE

| POSITION | CATEGORY | VALUE | A | B | C | D | E | F | R | X | 0 | 1 | 2 | 3 | 4 | 5 | 6 | 7 | 8 | 9 |
|---|---|---|---|---|---|---|---|---|---|---|---|---|---|---|---|---|---|---|---|---|
| | | | BINARY CODE | | | | | | CARD INDICIA CODE | | | | | | | | | | | |
| 1 | B | BLANK | 0 | 0 | 0 | 0 | 0 | 0 | | | | | | | | | | | | |
| 2 | N | 9 | 0 | 0 | 0 | 0 | 0 | 1 | | | | | | | | | | | | * |
| 3 | N | 8 | 0 | 0 | 0 | 0 | 1 | 0 | | | | | | | | | | | * | |
| 4 | | | 0 | 0 | 0 | 0 | 1 | 1 | | | | | | | | | | | | |
| 5 | N | 7 | 0 | 0 | 0 | 1 | 0 | 0 | | | | | | | | | | * | | |
| 6 | N | 6 | 0 | 0 | 0 | 1 | 0 | 1 | | | | | | | | | * | | | |
| 7 | N | 5 | 0 | 0 | 0 | 1 | 1 | 0 | | | | | | | | * | | | | |
| 8 | | | 0 | 0 | 0 | 1 | 1 | 1 | | | | | | | | | | | | |
| 9 | N | 4 | 0 | 0 | 1 | 0 | 0 | 0 | | | | | | | * | | | | | |
| 10 | N | 3 | 0 | 0 | 1 | 0 | 0 | 1 | | | | | | * | | | | | | |
| 11 | S | @ | 0 | 0 | 1 | 0 | 1 | 0 | | | | | | | * | | | | * | |
| 12 | S | # | 0 | 0 | 1 | 0 | 1 | 1 | | | | | | * | | | | | * | |
| 13 | N | 2 | 0 | 0 | 1 | 1 | 0 | 0 | | | | | * | | | | | | | |
| 14 | N | 1 | 0 | 0 | 1 | 1 | 0 | 1 | | | | * | | | | | | | | |
| 15 | N | | 0 | 0 | 1 | 1 | 1 | 0 | | | | | | | | | | | | |
| 16 | | | 0 | 0 | 1 | 1 | 1 | 1 | | | | | | | | | | | | |
| 17 | N | 0 | 0 | 1 | 0 | 0 | 0 | 0 | | | * | | | | | | | | | |
| 18 | A | Z | 0 | 1 | 0 | 0 | 0 | 1 | | | * | | | | | | | | | * |
| 19 | A | Y | 0 | 1 | 0 | 0 | 1 | 0 | | | * | | | | | | | | * | |
| 20 | | | 0 | 1 | 0 | 0 | 1 | 1 | | | | | | | | | | | | |
| 21 | A | X | 0 | 1 | 0 | 1 | 0 | 0 | | | * | | | | | | | * | | |
| 22 | A | W | 0 | 1 | 0 | 1 | 0 | 1 | | | * | | | | | | * | | | |
| 23 | A | V | 0 | 1 | 0 | 1 | 1 | 0 | | | * | | | | | * | | | | |
| 24 | | | 0 | 1 | 0 | 1 | 1 | 1 | | | | | | | | | | | | |
| 25 | A | U | 0 | 1 | 1 | 0 | 0 | 0 | | | * | | | | * | | | | | |
| 26 | A | T | 0 | 1 | 1 | 0 | 0 | 1 | | | * | | | * | | | | | | |
| 27 | S | % | 0 | 1 | 1 | 0 | 1 | 0 | | | * | | | | * | | | | * | |
| 28 | S | , | 0 | 1 | 1 | 0 | 1 | 1 | | | * | | | * | | | | | * | |
| 29 | A | S | 0 | 1 | 1 | 1 | 0 | 0 | | | * | | * | | | | | | | |
| 30 | S | / | 0 | 1 | 1 | 1 | 0 | 1 | | | * | * | | | | | | | | |
| 31 | | | 0 | 1 | 1 | 1 | 1 | 0 | | | | | | | | | | | | |
| 32 | | | 0 | 1 | 1 | 1 | 1 | 1 | | | | | | | | | | | | |
| 33 | S | – | 1 | 0 | 0 | 0 | 0 | 0 | | * | | | | | | | | | | |
| 34 | A | R | 1 | 0 | 0 | 0 | 0 | 1 | | * | | | | | | | | | | * |
| 35 | A | Q | 1 | 0 | 0 | 0 | 1 | 0 | | * | | | | | | | | | * | |
| 36 | | | 1 | 0 | 0 | 0 | 1 | 1 | | | | | | | | | | | | |
| 37 | A | P | 1 | 0 | 0 | 1 | 0 | 0 | | * | | | | | | | | * | | |
| 38 | A | O | 1 | 0 | 0 | 1 | 0 | 1 | | * | | | | | | | * | | | |
| 39 | A | N | 1 | 0 | 0 | 1 | 1 | 0 | | * | | | | | | * | | | | |
| 40 | | | 1 | 0 | 0 | 1 | 1 | 1 | | | | | | | | | | | | |
| 41 | A | M | 1 | 0 | 1 | 0 | 0 | 0 | | * | | | | | * | | | | | |
| 42 | A | L | 1 | 0 | 1 | 0 | 0 | 1 | | * | | | | * | | | | | | |
| 43 | S | * | 1 | 0 | 1 | 0 | 1 | 0 | | * | | | | | * | | | | * | |
| 44 | S | $ | 1 | 0 | 1 | 0 | 1 | 1 | | * | | | | * | | | | | * | |
| 45 | A | K | 1 | 0 | 1 | 1 | 0 | 0 | | * | | | * | | | | | | | |
| 46 | A | J | 1 | 0 | 1 | 1 | 0 | 1 | | * | | * | | | | | | | | |
| 47 | | | 1 | 0 | 1 | 1 | 1 | 0 | | | | | | | | | | | | |
| 48 | | | 1 | 0 | 1 | 1 | 1 | 1 | | | | | | | | | | | | |
| 49 | S | & | 1 | 1 | 0 | 0 | 0 | 0 | * | | | | | | | | | | | |
| 50 | A | I | 1 | 1 | 0 | 0 | 0 | 1 | * | | | | | | | | | | | * |
| 51 | A | H | 1 | 1 | 0 | 0 | 1 | 0 | * | | | | | | | | | | * | |
| 52 | | | 1 | 1 | 0 | 0 | 1 | 1 | | | | | | | | | | | | |
| 53 | A | G | 1 | 1 | 0 | 1 | 0 | 0 | * | | | | | | | | | * | | |
| 54 | A | F | 1 | 1 | 0 | 1 | 0 | 1 | * | | | | | | | | * | | | |
| 55 | A | E | 1 | 1 | 0 | 1 | 1 | 0 | * | | | | | | | * | | | | |
| 56 | | | 1 | 1 | 0 | 1 | 1 | 1 | | | | | | | | | | | | |
| 57 | A | D | 1 | 1 | 1 | 0 | 0 | 0 | * | | | | | | * | | | | | |
| 58 | A | C | 1 | 1 | 1 | 0 | 0 | 1 | * | | | | | * | | | | | | |
| 59 | S | ⌑ | 1 | 1 | 1 | 0 | 1 | 0 | * | | | | | | * | | | | * | |
| 60 | S | . | 1 | 1 | 1 | 0 | 1 | 1 | * | | | | | * | | | | | * | |
| 61 | A | B | 1 | 1 | 1 | 1 | 0 | 0 | * | | | | * | | | | | | | |
| 62 | A | A | 1 | 1 | 1 | 1 | 0 | 1 | * | | | * | | | | | | | | |
| 63 | | | 1 | 1 | 1 | 1 | 1 | 0 | | | | | | | | | | | | |
| 64 | | | 1 | 1 | 1 | 1 | 1 | 1 | | | | | | | | | | | | |

FIG. 3

INVENTOR.
DONALD H. APGAR

BY J. Tancin Jr.

ATTORNEY

Nov. 8, 1960 D. H. APGAR 2,959,283

DATA COMPARING DEVICE

Filed Aug. 31, 1954 7 Sheets-Sheet 3

INVENTOR.
DONALD H. APGAR

BY J. Jancin Jr.
ATTORNEY

INVENTOR.
DONALD H. APGAR

BY

J. Jancin Jr.

ATTORNEY

Nov. 8, 1960 D. H. APGAR 2,959,283

DATA COMPARING DEVICE

Filed Aug. 31, 1954 7 Sheets-Sheet 5

INVENTOR.
DONALD H. APGAR

BY J. Tancin Jr.
ATTORNEY

INVENTOR.
DONALD H. APGAR

BY J. Tancin Jr.
ATTORNEY

INVENTOR.
DONALD H. APGAR

BY J. Jancin Jr.

ATTORNEY

United States Patent Office 2,959,283

Patented Nov. 8, 1960

2,959,283

DATA COMPARING DEVICE

Donald H. Apgar, Binghamton, N.Y., assignor to International Business Machines Corporation, New York, N.Y., a corporation of New York Filed Aug. 31, 1954, Ser. No. 453,387

9 Claims. (Cl. 209—110)

This invention relates to record card distributing and collating machines and, particularly, to data comparing devices thereof.

Briefly described, a record card controlled distributing and collating machine is used to sort two separate sets of record cards which are fed through two separate record card feeding mechanisms in accordance with control data designations on the cards. The basis of automatic operation of such a machine is found in the apparatus thereof which compares the record card control data so as to govern the advancement of the record cards. Accordingly, such a machine can be used to merge two sets of cards together, or it can be used to select out certain cards from either of the two sets of cards for distribution to any one of a plurality of card batches. As stated previously, the basis of the automatic operation of a record card distributing and collating machine is found in the control data compare apparatus. This invention is directed to a collator having a data comparing device for determining the relative magnitude of primary and secondary data in accordance with a first prescribed scale, and means effective in response to an unequal data comparison result for modifying the aforesaid relative magnitude in accordance with a second prescribed scale.

It is well known to persons familiar with the record card controlled machine art that cards having information thereon in accordance with the well-known IBM code contain numerical information which is designated in a card column by a single entry, e.g., a marking or a perforation, at a corresponding index point or position; alphabetic character information which is designated by combinational entries in a card column, one entry in a zone position and another entry in a numerical position; special-character information which is designated in a card column by either a single entry in a zone index position or combinational entries designated by specific zone and numerical index positions; and blank column information which is designated in a card column by the absence of an index point entry.

Patent No. 2,602,544, issued to Phelps et al. on July 8, 1952, shows and describes a record card controlled collator for operating not only according to numerical information recorded on cards, as do earlier collating machines of the type disclosed in Page Patent No. 2,359,670 which issued on October 3, 1944, but also according to alphabetic information or alphabetic-numerical information recorded on the cards.

As is stated in the Phelps et al. patent, one difficulty when comparing the afore-mentioned types of information recorded on record cards, is that the comparison must take into account not only the positional significance of an index point entry, i.e., a record card perforation in the preferred embodiment of this invention, but whether it occurs in combination with another perforation, or alone. Another difficulty arises from the fact that a perforation has one value in a prescribed scale of values when it occurs alone and shares in defining a different value in the scale when it occurs in a combination of perforations. Still additional difficulties arise from the use of a blank column as a value in the scale, as well as from the use of special-character values. An understanding of the foregoing difficulties may be realized more readily by examining the afore-mentioned IBM punched card code which is shown in Fig. 3 under the heading Card Indicia Code. This examination will reveal that the IBM code per se is not a collatable one. Furthermore, even after the IBM code is translated to an intermediate code, such as a binary code for example, the characters defined by the binary code are not readily collatable. That is, they do not fall naturally into a chosen sequence which includes blank, special-character, alphabetic and numerical classes of data which are arranged according to the following arbitrary scale, herein referred to as the "second" scale, wherein the blank datum is low and the numerical datum "9" is high:

(1) Blank
(2) Special character
  (a) . (period)
  (b) ◻
  (c) &
  (d) $
  (e) *
  (f) —
  (g) /
  (h) , (comma)
  (i) %
  (j) #
  (k) @
(3) Alphabetic
  (a) A through Z
(4) Numeric
  (a) 0 through 9

TABLE 1

The reason that the characters defined by the binary code do not fall naturally into the chosen sequence is that the data within each of these different classes are interspersed to an extent within one large group according to another arbitrary scale (see Fig. 3) herein referred to as the "first" scale, wherein the alphabetic character "A" is low and the blank value is high. Thus, when it is desired to determine the relative magnitude of a first data with respect to a second data, it is necessary to correct or modify by a suitable means the comparison results initially produced according to the afore-mentioned "first" scale so as to produce a final relative magnitude result which is in accordance with the prescribed scale of values; namely, the "second" scale. This is due to the fact that in accordance with the "second" scale (Table 1), any special-character for example, is of lower magnitude than any alphabetic or numerical character, but yet when judged by the "first" scale (Fig. 3), the particular special-character may be of higher magnitude than the given alphabetic or numerical character. For example, referring to Fig. 3, the special character "#" is higher according to the "first" scale than the numerical character "2." A correction or modification thereof, to be described in detail hereinafter, is necessary in order that the data comparison operation affords a final comparing result which will indicate that the "#" datum is lower than the numeral '2' in accordance with the "second" scale.

To describe the comparison operation of the preferred embodiment of this invention briefly, two groups of data are initially compared in accordance with the afore-mentioned "first" scale (Fig. 3). This initial operation may be termed an intracomparison one because if the data being compared fall within the same class, such as alphabet for example, the initial comparison result is also in accordance with the "second" scale, and is correct. Thus if the two groups of data are equal no correction or modification of the initial equal result is necessary. If the two groups of data are not equal it is necessary to correct or modify the initial comparison result by apparatus to be described in detail hereinafter so as to cause a final relative magnitude comparing result i.e., one which may be termed an intercomparison result, which is consistent with the afore-mentioned "second" scale (Table 1).

A principal object of this invention is to provide an improved data comparing means capable of handling alphabetic, numerical, special-character and/or blank data.

Another object of this invention is to provide improved means for controlling the operation of a collator or the like, according to alphabetic, numerical, special-character or blank information recorded on record cards.

Another object of this invention is to provide apparatus for modifying the data comparing means so as to produce a comparison result which is consistent with a prescribed scale of values.

More specifically, another object of this invention is to provide apparatus controlled by special-character designations for modifying data comparing means controlled by alphabetic, numerical, special-character and blank data designations.

Other objects of the invention will be pointed out in the following description and claims and illustrated in the accompanying drawings, which disclose, by way of example, the principle of the invention and the best mode which has been contemplated, of applying that principle.

In the drawings:

Fig. 3 is a chart which shows the relationship between the card indicia code and the data comparing unit binary code for each alphabetic, numerical, special-character and blank datum.

Figs. 4*a* to 4*e*, inclusive, form a wiring diagram for the data comparing device.

Figure 5:
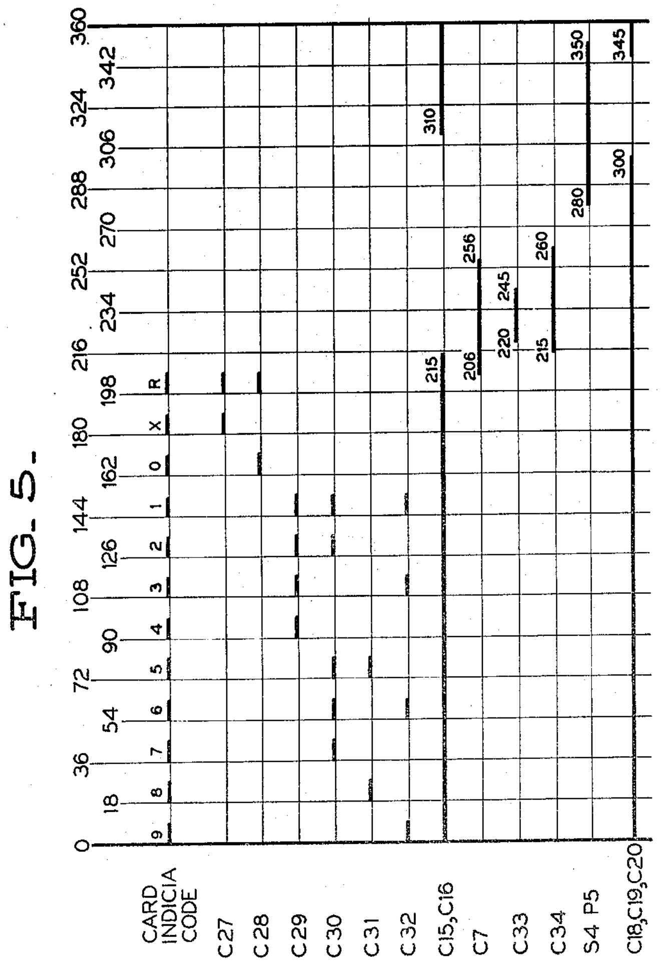

Fig. 5 is a timing chart.

*General collator operation*

Figure 1:
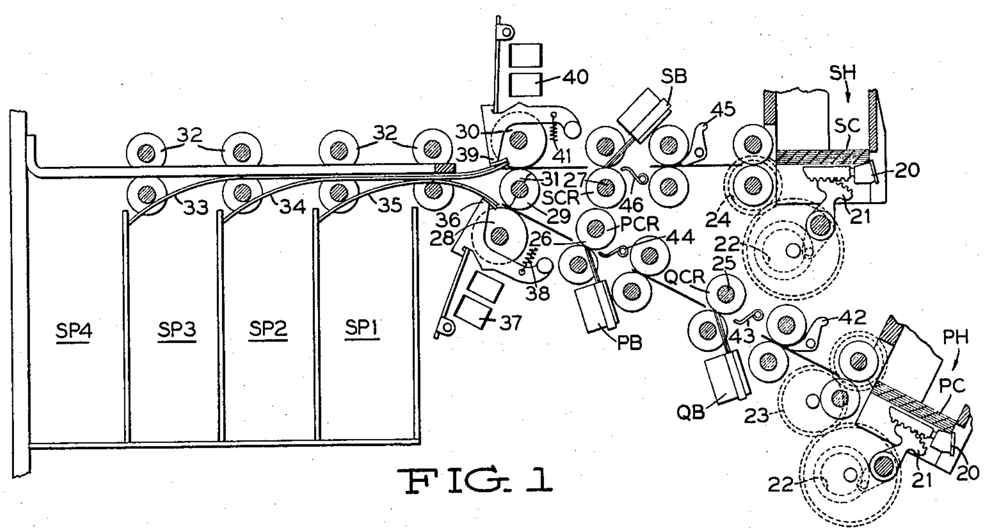
Fig. 1 is a somewhat diagrammatic view of a record card collating machine for handling two batches of cards.

Inasmuch as the collator mechanism shown diagrammatically in Fig. 1 is shown and described fully in the afore-mentioned Phelps et al. and Page patents, it will be explained only briefly herein so as to avoid undue complexity and unnecessary prolixity.

Referring to Fig. 1, cards placed in primary hopper PH are designated PC and called primary cards. Cards in secondary hopper SH are designated SC and referred to as secondary cards. Pickers 20 are adapted to feed cards out of the hoppers. The pickers have rack teeth meshed with gear segments 21 which are oscillated by box cams 22 rigid with gears 23 and 24. Gear 23, in the primary side, is driven through a suitable clutch gear train as is gear 24, in the secondary side. The two contact roll shafts 25 and 26 in the primary side and the contact roll shaft 27 in the secondary side, are also suitably connected to their respective afore-mentioned gear trains. Both the primary and secondary card feeds are under control of the associated feed clutches (not shown) represented by block 59 in Fig. 2. Contact roll shaft 25 (Fig. 1) in the primary side, carries contact roll QCR coacting with reading brushes QB to read primary cards passing through the sequence brush station QBS (see also Fig. 2). The contact roll shaft 26, in the primary side, carries contact roll PCR coacting with reading brushes PB to read primary cards traversing the primary station PBS. The shaft 27, in the secondary side carries a contact roll SCR to coact with brushes SB to read secondary cards as they traverse the secondary station SBS.

With the primary feed in operation, the related picker 20 will feed a card from the hopper PH. The card will be fed further by the feed rollers in the primary side to eject rollers 28 and 29. With the secondary feed in operation, a card will be fed from the hopper SH by the related picker 20, and then by the feed rollers to the eject rolls 30 and 31. The eject rolls 30 and 31 are driven by the secondary feed drive mechanism, whereas the primary eject rolls 28 and 29 are driven through a separate drive means including a one-revolution eject clutch (not shown).

Four feed rollers 32 are driven to coact with feed rollers on companion shafts so as to feed the cards issuing from the eject rolls to a selected one of four card stacker pockets to which the cards may be selectively distributed. The pockets are designed SP1, SP2, SP3, and SP4. There are three guide blades 33, 34, and 35 for directing cards to selected pockets. Blade 35 rests at the rear upon the toe of a lever 36 associated with the magnet 37. With this magnet inactive, cards issuing from primary eject rolls 28 and 29 pass over the blade 35 into pocket SP2. Upon the energization of magnet 37, the related lever 36 is unhooked allowing it to be moved upwardly by a spring 38, and thereby to lift the rear end of blade 35. A card issuing from eject rolls 28 and 29 will then pass under blade 35 into pocket SP1. The rear end of top blade 33 extends under the toe of lever 39 associated with the magnet 40, while the rear end of the blade 34 extends under the toe of a similar lever (not shown) associated with a magnet (also not shown) similar to magnet 40. With both foregoing magnets de-energized, cards issuing from secondary feed eject rolls 30 and 31, feed under blade 34 into pocket SP2. With the afore-mentioned magnet which is similar to magnet 40, energized, blade 34 is depressed at the rear end to allow cards issuing from eject rolls 30 and 31 to pass over this blade and under blade 33 into pocket SP3. When magnet 40 is energized, it unhooks the lever 39 associated therewith and also the lever (not shown) similar thereto associated with the magnet (also not shown) similar to the magnet 40, allowing the attached spring 41 to rock these levers counterclockwise. Consequently, blades 33 and 34 are both depressed, and a card issuing from eject rolls 30 and 31 will pass over both blades into pocket SP4.

There are, of course, various card lever contacts, hopper contacts, cam contacts, etc. The primary feed card lever contacts are represented by levers 42, 43, and 44, and the secondary card feed lever contacts are represented by levers 45 and 46. The various cam contacts shown in the circuit diagrams are of three classes. One class comprises continuously operating cam contacts given the general designation C. A second class includes those contacts operated only when the primary feed is operative and cam contacts in this class have the general designation P. The third class includes contacts which operate only when the secondary feed is operative and these cam contacts have the general designation S.

As usual, the reading brushes for sensing card information are connected to plug hubs which appear in a plugboard panel. These pluggable connections are provided to allow for flexible control, and for any chosen field of card columns to be ultimately compared. In the circuit diagram, only two hubs per brush station are shown for sake of simplicity; i.e., hubs connected to the brushes for reading only columns 1 and 80, for example.

Figure 2:
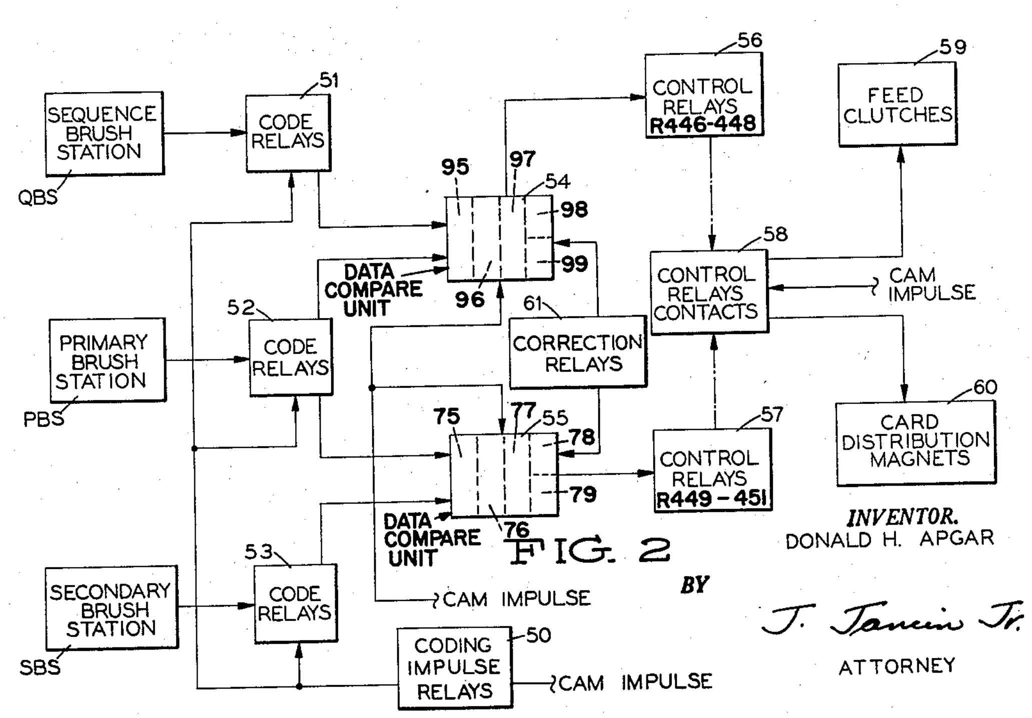
Fig. 2 is a block diagram depicting the general scheme of operation for the afore-mentioned record card collating machine.
Figure 4A:
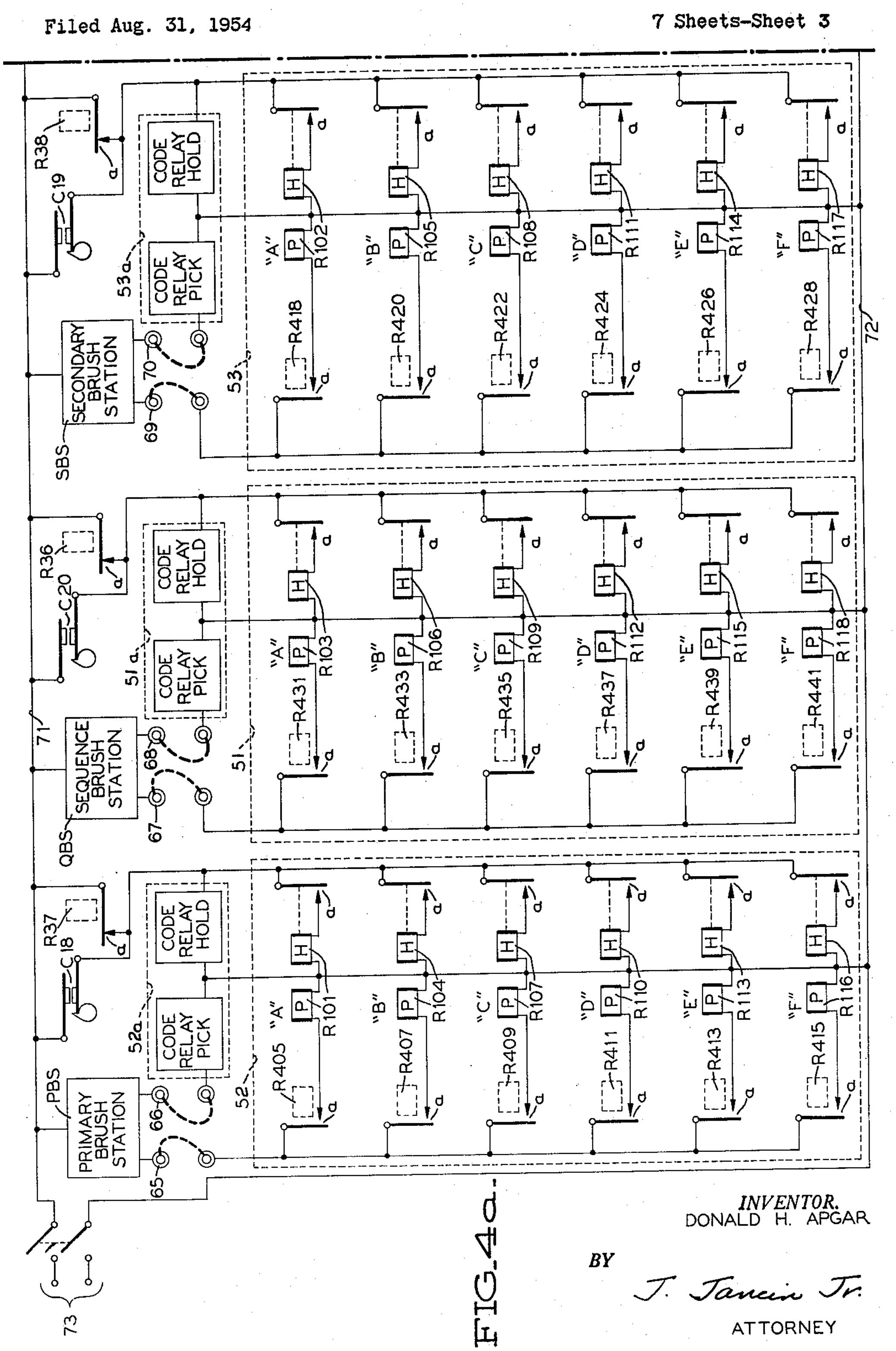

Referring to Fig. 2, data read by the brushes is manifested by code relays represented to be within blocks 51, 52, and 53, shown in Fig. 4*a*, and picked in accordance with the binary code, during a corresponding feed unit machine cycle, by reading brush controlled impulses, e.g., those impulses transmitted from sequence brush station QBS, directed through coding impulse relay contacts, such as contacts R431*a* for example. The sequence station code relays within block 51 and the primary station code relays within block 52, control the operation of contacts which are arranged to form the primary-sequence data compare unit (see also Figs. 4*c*, elements 95, 95*a*, and 4*d*, elements 96, 96*a*, 97, 97*a*, 98, 98*a*, 99 and 99*a*) identified by reference numeral 54. The primary station code relays within block 52 and the secondary station code relays within block 53 govern contacts which are arranged to provide a cross-feed or primary-secondary data compare unit represented by block 55 and comprising elements 75, 75*a* of Fig. 4*c* and elements 76, 76*a*, 77, 77*a*, 78, 78*a*, 79 and 79*a* of Fig. 4*d*. The correction relays within block 61 are employed to correct or modify an initial comparing result when necessary so that the final comparing result is in accordance with the prescribed scale of values. The outputs of data compare units 54 and 55 are used to govern control relays (see also Fig. 4*e*) within blocks 56 and 57. The control relays, in turn, set up the control relay contacts in block 58 corresponding to contacts of relays PL, PES, SL, QE, QH, and QL of Fig. 3*f* of Phelps et al., whereupon cam impulses corresponding to those from cam CR1 of Phelps et al., directly through these contacts control the primary, secondary and eject feed clutches represented by block 59 corresponding to clutches 145, 146, and ECL of Phelps et al., and the record card distributing magnets identified by reference numeral 60 corresponding to magnets PRM, SRM2, and SRM1 of Phelps et al. It will be noted that throughout the specification, only the low order and high order elements of the code relays, data compare units, etc., have been shown instead of the elements for each and every order. The low order element, such as the primary-secondary initial compare circuit 75 of Fig. 4*c*, is the compare circuit for the first or low order, while 75*a* designates the corresponding compare unit for the highest order, the intervening order units being omitted for purposes of simplification, following the practice as shown in Fig. 3*d* of the Phelps et al. Patent 2,602,544, wherein only the highest order primary run selection relay comparison circuit is shown in detail, followed by the lowest order in block form.

*Data comparing apparatus*

As is stated previously, the data to be compared falls within one of a plurality of classes each of which is designated as an alphabetic, numerical, special-character or blank class. Furthermore, each one of these classes is arranged according to an arbitrary "second" scale (Table 1) wherein the blank datum is low when compared with special-character data, the special-character data are low when compared with alphabetic data, and the alphabetic data are low when compred with numerical data. In short, the aforementioned classes are arranged according to the "second" scale in an ascending fashion from blank to special-character to alphabet to numeral.

The card indicia code used to represent information on record cards is shown in Fig. 3. For example, a numeral 9 is represented in a record card by a single column perforation at the 9 index point of the record card, and a numeral 1 is represented by a single column perforation at the 1 index point, whereas the alphabetic character S is represented by combinational perforations in a single card column at the 0 and 2 index points. An examination of Fig. 3 will reveal that the numerical (0–9) and alphabetic (A–Z) information designated by the letters N and A, respectively, under the heading Category, are sequentially arranged one to the other wherein the alphabetic character A is low and the numerical datum 9 is high, whereas the special-character information designated by the letter S under the heading Category in Fig. 3, is scattered throughout the complete code range. In addition thereto, the blank value according to the "first" scale is high. As the description advances, it will become clear that it is for this reason, and the fact that a blank column is assigned a weighted value that a modifying or correction means for the data comparing apparatus is necessary so as to effect a final comparing result which is in accordance with the "second" scale (Table 1).

The twelve unit IBM card indicia code is translated to an intermediate six unit binary code employing six binary relays which are generally designated for the sake of simplicity and clarity by the letters A through F. These relays are rendered operated selectively in response to the detection of index point perforations recorded on a record card, in accordance with the following table:

| Binary code relay: | Card index points |
|---|---|
| Relay A, e.g., R101 (Fig. 4*a*) | (X—R). |
| Relay B, e.g., R104 | (O—R). |
| Relay C, e.g., R107 | (4—3—2—1). |
| Relay D, e.g., R110 | (7—6—5—2—1). |
| Relay E, e.g., R113 | (8—5). |
| Relay F, e.g., R116 | (9—6—3—1). |

TABLE 2

That is, the numeral 9 is represented in the binary code by the operation of a code relay F (see Fig. 3), and the numeral 1 is represented in this code by the operation of code relays C, D and F. On the other hand, the alphabetic character S is represented in the binary code by the operation of code relays B, C and D.

The primary station data code relays R101, R104, R107, R110, R113 and R116 (Fig. 4*a*), the sequence station data code relays R103, R106, R109, R112, R115 and R118, and the secondary station data code relays R102, R105, R108, R111, R114 and R117, shown in Fig. 2 to be within blocks 52, 51, and 53, respectively, are each caused to pick consequent upon a time-wise coincidence between the operation of a corresponding coding impulse relay within block 50 (see Fig. 4*b*) and the detection by a related brush station PBS, QBS and SBS of an index point perforation. That is, since the coding impulse relays operate every machine cycle during the operation of a corresponding feed, primary station data code "A" relay R101, for example, will pick in response to the primary brush station PBS detecting either an X or an R card index point perforation; "C" code relay R107, for instance, will pick in response to the detection of either a 4, 3, 2 or 1 index point perforation, etc. Thus, the afore-mentioned code relays are controlled by card indicia code impulses directed from their respective brush stations and through related coding impulse relay contacts, to thereby effect storage in a binary code of the information which is recorded on the record cards.

The contacts common to the primary and secondary code relays 52 and 53 of Fig. 2 control an "initial" comparing unit 75 (Fig. 4*c*) which is part of the Data Compare Unit 55 of Fig. 2 for providing an intracomparison result, and contacts of the primary and sequence code relays 51 and 52 of Fig. 2 control an "initial" comparing unit 95 forming part of the Data Compare Unit 54 of Fig. 2, to thereby afford initial comparing results which are in accordance with the afore-mentioned "first" scale shown in Fig. 3. If this initial comparing operation in either of the units 75 or 95 provides an equal result, a further data comparison is not necessary. The reason for this will become clear shortly. However, if this initial comparison operation result indicates unequal data; i.e., the relative magnitude of the primary data, for example, with respect to the secondary data is either high or low, a correction or modification thereof is necessary because, it will be recalled, the special-characters are interspersed among the alphabetic and numerical characters, and the blank datum is included in the code range.

In line with the foregoing, if, as a result of the initial comparing operation, the relative magnitude of the primary data is high with respect to the secondary data, the following points must be checked in order to provide a final comparing result which is in accordance with the prescribed scale of values:

(1) Whether the primary data is within the special-character class. If so, an examination of the class arrangement in Table 1 will indicate that the primary data should be low. Hence, the correction contacts within block 76 (Figs. 2 and 4*d*) will be transferred so as to direct the test impulse to the secondary code relay contact circuits within block 77.

(2) If the primary data fall within the special-character class, a determination as to whether the secondary data fall within this class is necessary. If the secondary data are in the special-character class, the initial comparing result will be correct inasmuch as the two data are within the same class, and the test impulse from the circuits within block 77 will correspond to that output from block 75.

(3) Whether the primary data fall in the blank class and, if so, the primary blank data correction circuits within block 79 will alter the initial comparing result.

On the other hand, if, as a result on the initial comparing operation, the relative magnitude of the primary data with respect to the secondary data is low, the following points must be checked in order to provide a final comparing result which is in accordance with the prescribed scale of values:

(1) Whether the primary data fall within the special-charcater class. If so, the initial comparing result will be correct inasmuch as in accordance with the "second" scale of values, the special-character class is low with respect to the alphabetic and numerical classes.

(2) If the primary data does not fall within a special-character class, it must be determined whether the secondary data fall within such a class. If the secondary data does belong to a special-character class, the initial comparing result will be altered so that the output test impulse from the circuits within block 77 will indicate a low secondary value.

(3) Whether the secondary data fall within the blank class and, if so, the initial comparing result will be altered by the secondary blank data correction circuits within block 78.

It will be recognized that if the aforementioned initial comparing result from the apparatus within block 75 is an unequal result, the data wherefrom this unequal is obtained is in effect checked under the control of correction relays 61 of Fig. 2 comprising relays R389—390 of Fig. 4*c*, so that the unequal result may be corrected or modified if necessary, by correction apparatus also controlled by contacts common to the aforesaid primary and secondary code relays. The final comparison result due to the modification of the initial comparing result by the so-called correction circuits, will be in accordance with the "second" scale of values shown in Table 1.

*Operation and circuits*

Referring to Fig. 4*a*, a suitable power supply represented by bracket 73 causes operating voltages to be applied to lines 71 and 72. As state dhereinbefore, blocks PBS, QBS and SBS represent the primary, sequence and secondary brush stations, respectively, which include reading brushes for sensing card indicia. Hubs 65 and 66 are each connected to primary brushes for reading primary card columns, columns 1 and 80 for example, hubs 67 and 68 are each connected to sequence brushes for reading primary card columns 1 and 80, and hubs 69 and 70 are each connected to secondary brushes for reading secondary card columns 1 and 80.

Code relay units 52 and 52*a* are associated with the brushes in the primary brush station for reading columns 1 and 80, code relay units 51 and 51*a* are similarly associated with the sequence brush station, and code relay units 53 and 53*a* are also similarly associated with the secondary brush station. Only the circuits for units 51, 52, and 53 are shown in detail; the other unit circuits being similar in arrangement and function to the circuits in the associated units.

Figure 4B:
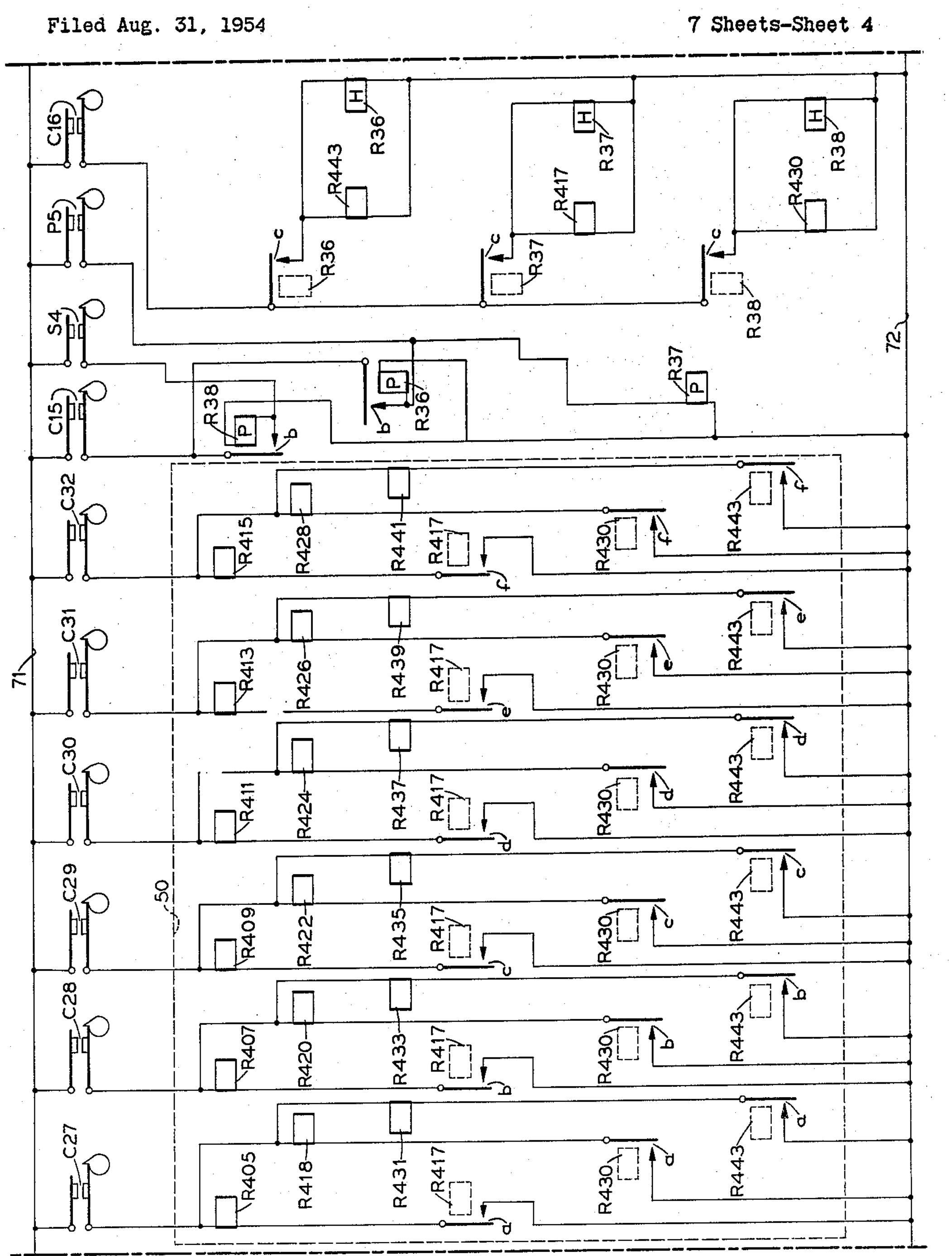
Figure 4C:
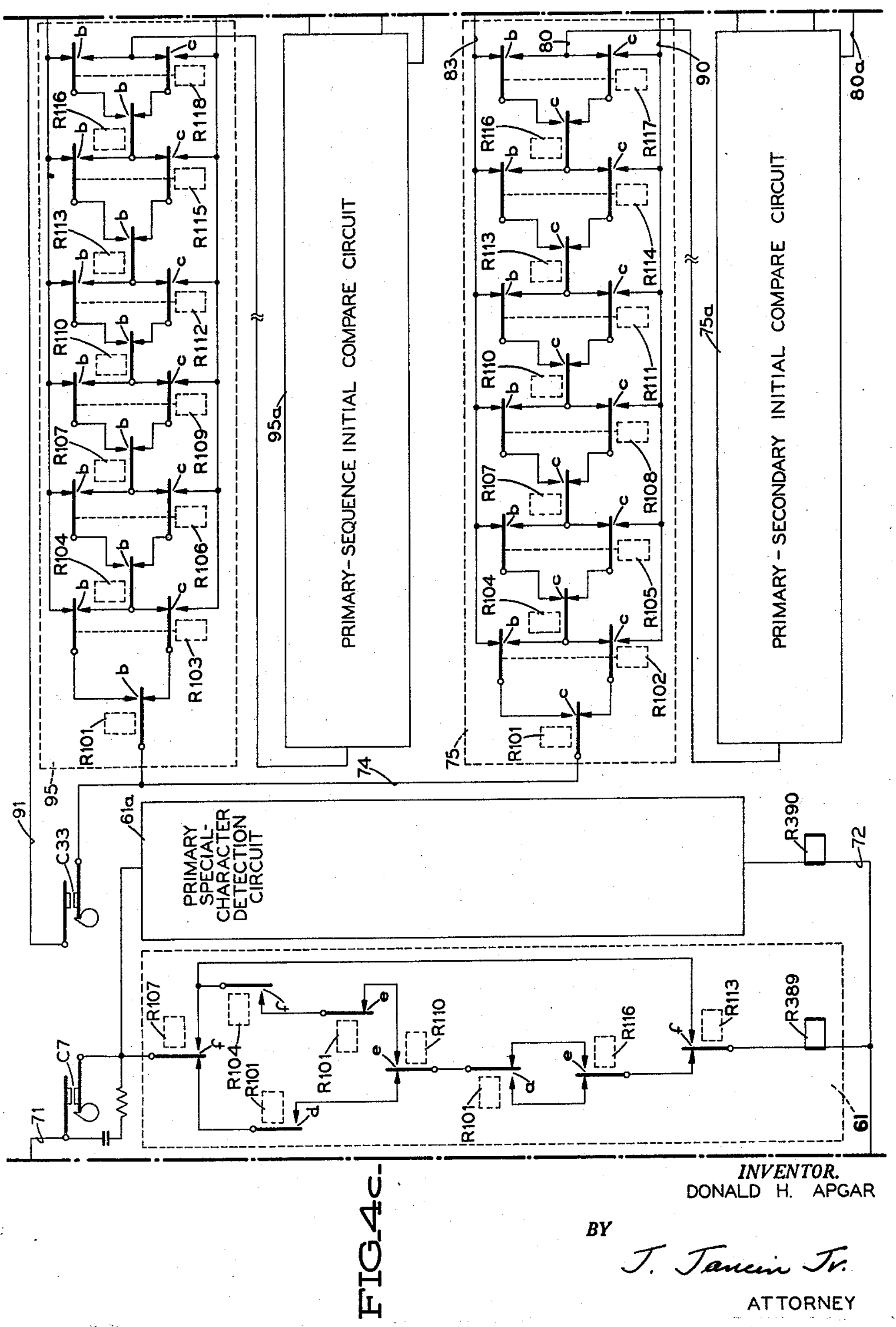
Figure 4D:
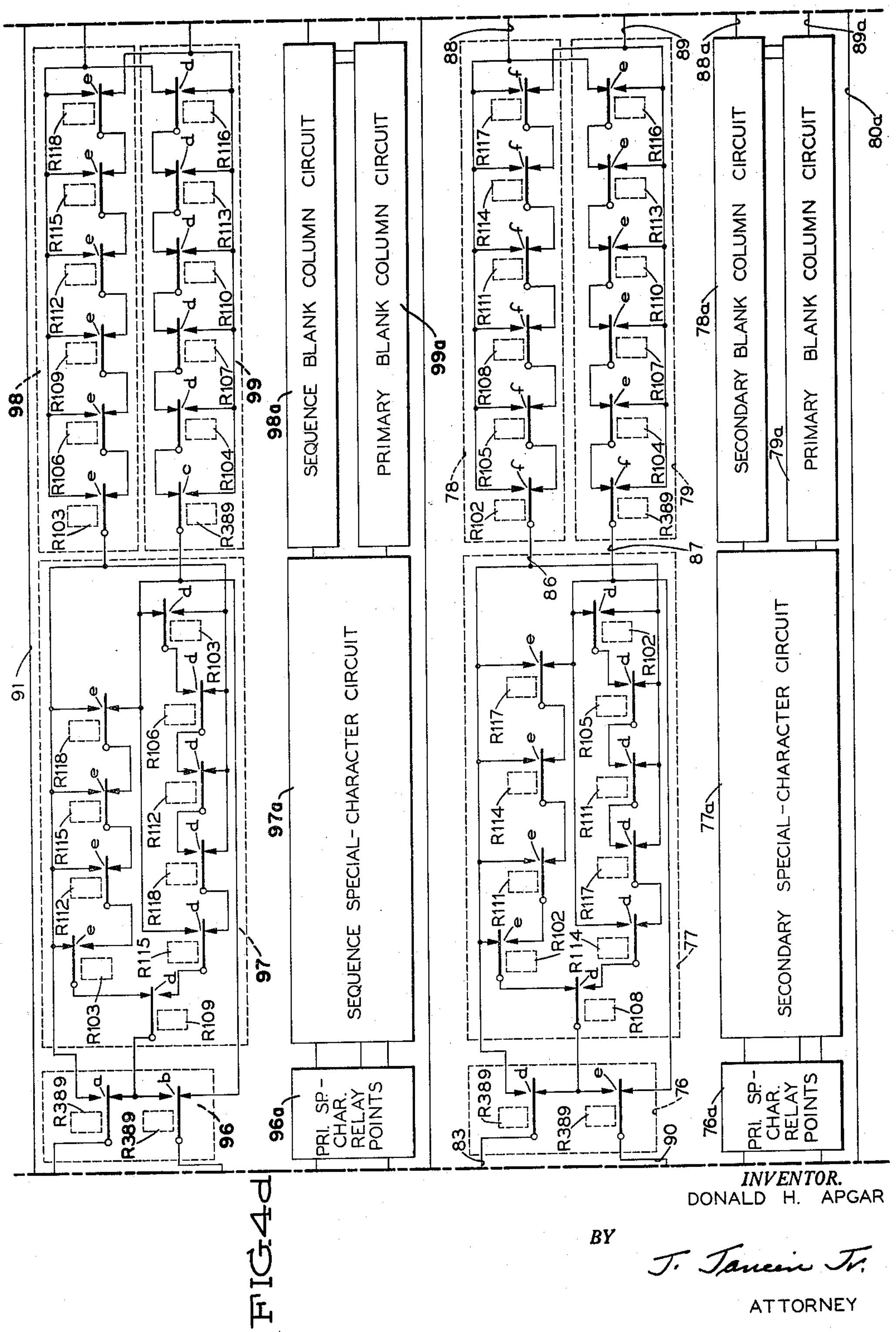

Referring to Fig. 4*b*, the upper row of primary coding impulse relays R405, R407, R409, R411, R413 and R415, the center row of secondary coding impulse relays R418, R420, R422, R424, R426 and R428, and the lower row of sequence coding impulse relays R431, R433, R435, R437, R439 and R441, all of which are shown to be within block 50 (see also Fig. 2), are selectively picked every machine cycle via their respective cam contacts C27 through C32, and the contacts of timing relays R417, R430, and R443. These cam contacts are timed to the record card collator feed tracks in conformance with the afore-mentioned binary code. That is, cam contacts C27, for example, close during binary code "A" time or X and R card index times, contacts 28 close during binary code "B" time or 0 and R index times, etc. The timing relays, on the other hand, are caused to pick only during particular card feed cycles. Relay R417, for example, is energized only during a primary feed cycle while relay R37H is maintained energized via contacts C16 and R37*c*. It is to be observed that relay R37P is picked via primary cam contacts P5.

If, for example, a record card having a 9 hole punched in column 1 thereof is advanced past the primary brush station PBS (Fig. 4*a*), primary code relay coil R116P will be energized via coding impulse relay contacts R415*a*. This code relay will be maintained picked due to a hold circuit to coil R116H via contacts R37*a* and R116*a* until primary storage reset relay R37 (Fig. 4*b*) is operated through cam contacts P5 during a primary feed cycle. In a similar fashion, the data stored by the sequence and secondary code relays is controlled by the reset relays R36 and R38, respectively. It may be pointed out at this time that normally open cam contacts P5 and S4 are closed only during a respective primary and secondary feed cycle.

In order to describe the data comparing apparatus circuit operation in detail, several separate examples will be explained. However, in order to avoid unnecessary prolixity, only cross-feed data compare operations will be described, it being understood that sequence data compare operations are similar thereto.

*Equal primary and secondary data.*—Assuming the primary record card to be perforated in column 1 at index positions X and 1, and the secondary record card to be perforated in column 1 at similar index positions, primary and secondary code relays A (Fig. 4*a*), C, D, and F will be energized (see Table 2). That is, primary code relays R101, R107, R110 and R116, and secondary code relays R102, R108, R111, and R117 will be energized. Thus, when a test signal is applied to line 74 (Fig. 4*c*) via cam contacts C33, a circuit will be completed through contacts R101*c* normally open (*n/o*), R102*b n/o*, R104*c* normally closed (*n/c*), R105*c n/c*, R107*c n/o*, R108*b n/o*, R110*c n/o*, R111*b n/o*, R113*c n/c*, R114*c n/c*, R116*c n/o*, and R117*b n/o*, to equal output line 80. As mentioned previously, an equal representation of data by the relay contact circuit within "initial" comparing block 75 makes it unnecessary to employ a correction or modifying means. The test signal applied to line 80 will pass through the contacts within blocks 75*a*, all of which are in normal status, so as to appear on line 80*a*.

*High secondary data—primary and secondary data within same class.*—Assuming the secondary record card to have a hole punched in column 1 at the 9 index position and the primary card to have a hole punched in column 1 at the 8 index position, to thereby represent the numerals 9 and 8 respectively, primary code relay E (Table 2) and secondary code relay F will be picked. Thus, a test impulse applied to line 74 (Fig. 4*c*) will pass through contacts R101*c n/c*, R102*c n/c*, R104*c n/c*, R105*c n/c*, R107*c n/c*, R108*c n/c*, R110*c n/c*, R111*c n/c*, R113*c n/o*, and R114 *n/c*, to high secondary line 83. Since contacts R389*d* and *e* (Fig. 4*d*) are transferred only if the primary data are a special-character (the circuits for operating relay R389 will be described shortly), and inasmuch as the primary datum in the instant example is of numerical value, relay R389 will not be picked and the contacts thereof will remain normal. Thus, a test impulse directed to high secondary line 83 will be directed through the primary correction relay contacts R389*d n/c* to the secondary code relay contacts represented to be within block 77. So long as the secondary datum is not a special-character, the test impulse applied to high secondary line 83 will appear at corresponding high secondary line 86. If the secondary datum were a special-character, the test impulse would be directed to low secondary line 87. This, of course, is in keeping with the "second" scale shown in Table 1.

Since only contacts R117*e* within secondary code relay block 77 are transferred, the test impulse applied to line 83 will be directed through contacts R389*d n/c*, R108*d n/c*, and R102*e n/c*, to high secondary output line 86. This impulse is then directed through the secondary data blank column detection circuit 78 consisting of secondary code relay contacts, so as to pass through contacts R102*f n/c*, R105*f n/c*, R108*f n/c*, R111*f n/c*, R114*f n/c*, and R117*f n/o*, to high secondary output line 88. So long as the secondary datum is not a blank, the test impulse directed from high secondary line 86 will appear at corresponding high secondary line 88. If the secondary datum were a blank, this test impulse would be directed to low secondary line 89.

*Low secondary data—primary and secondary data within same class.*—Assuming the secondary record card to have a hole punched in column 1 at the 8 index position and the primary card to have a hole punched in column 1 at the 9 index position, primary code relay F and seecondary code relay E will be energized. Thus, a test impulse applied to line 74 (Fig. 4*c*) via cam contacts C33 will be directed through relay contacts R101*c n/c*, R102*c n/c*, R104*c n/c*, R105*c n/c*, R107*c n/c*, R108*c n/c*, R110*c n/c*, R111*c n/c*, R113*c n/c* and R114*c n/o*, to low secondary line 90. Inasmuch as the primary datum is not of a special-character value, relay contacts R389*e* will not be transferred and the test impulse applied to low secondary line 90 will bypass the secondary code relay contacts within block 77, so as to be applied directly to the primary blank column detection circuit identified by block 79. This, of course, is for the reason that since the primary datum is not a special-character, it does not matter whether the secondary datum is or is not a special-character, once it has been determined that the secondary datum is low. The test impulse directed to line 87 from line 90, will pass through relay contacts R389*f n/c*, R104*e n/c*, R107*e n/c*, R110*e n/c*, R113*e n/c*, and R116*e n/o*, to low secondary output line 89.

*Special-character secondary and alphabetic character primary.*—Assuming the secondary record card to be perforated in column 1 at the index positions 3 and 8, and the primary card to be perforated in column 1 at index position 0 and 9, secondary code relays C, E and F, and primary code relays B and F will be energized. Hence, a test impulse applied to line 74 (Fig. 4*c*) will be directed through relay contacts R101*c n/c*, R102*c n/c*, R104*c n/o*, and R105*b n/c*, to high secondary line 83. Due to the fact that the primary character is within the alphabetic class, relay contacts R389*d* will not be transferred, and the test impulse applied to high secondary line 83 will be directed through contacts R389*d n/c* to the secondary code special-character circuits within block 77. This test impulse will pass through contacts R108*d n/o* and R114*d n/o*, to secondary output line 87. It may be recognized then, that although the initial comparing result indicates the secondary datum to be high, the modifying circuit within block 77 effects an alteration of the initial comparing result in accordance with the "second" scale. The test impulse applied to low secondary line 87 is caused to pass through contacts R389*f n/c* and R104*e n/o*, to low secondary line 89.

*Special-character secondary and blank primary.*—Assuming the secondary card to be perforated in column 1 at index positions 3 and 8 and the primary card column 1 to be blank, only the secondary code relays C, E and F will be energized. Thus, a test impulse applied to line 74 will be directed through relay contacts R101*c n/c*, R102*c n/c*, R104*c n/c*, R105*c n/c*, R107*c n/c*, and R108*c n/o*, to low secondary output line 90. By referring to the "second" scale shown in Table 1, it may be seen that the initial comparing low secondary result is incorrect inasmuch as any special-character is of a higher magnitude than a blank value.

Since the primary card column is blank, relay contacts R389*e* will remain normal, and the test impulse applied to low secondary line 90 will be directed to corresponding low secondary line 87, and from line 87 through relay contacts R389*f n/c*, R104*e n/c*, R107*e n/c*, R110*e n/c*, R113*e n/c*, and R116*e n/c*, to high secondary output line 88. Hence, although the initial comparing result effected by the circuits within block 77 is one wherein the secondary datum is low with respect to the primary datum, the primary blank column detection circuit within block 79 causes a modification thereof in accordance with the "second" scale shown in Table 1.

*Special-character secondary and special-character primary.*—Assuming the secondary record card to be punched in column 1 at index positions 3 and 8 and the primary card to be punched in column 1 at index positions 4 and 8, secondary code relays C, E and F, and primary code relays C and E will be energized. A test impulse applied to line 74 (Fig. 4*c*) will be directed through relay contacts R101*c n/c*, R102*c n/c*, R104*c n/c*, R105*c n/c*, R107*c n/o*, R108*b n/o*, R110*c n/c*, R111*c n/c*, R113*c n/o*, R114*b n/o*, R116*c n/c*, and R117*c n/o*, to low secondary line 90. Since the primary datum is a special-character, correction relay R389 will have been picked through a circuit from line 71 (Fig. 4*c*) through contacts C7, R107*f n/o* and R113*f n/o*, relay R389, to line 72.

The test impulse applied to low secondary line 90 will then be directed through relay contacts R389*e n/o* (Fig. 4*d*), R108*d n/o*, and R114*d n/o*, to low secondary line 87, and from line 87 the test impulse will be directed through contacts R389*f n/o* to low secondary output line 89.

*Numerical secondary and special-character primary.*—Assuming the secondary card to be perforated in column 1 at the index position 9 and the primary card to be perforated in column 1 at index positions 3 and 8, secondary code relay F and primary code relays C, E and F will be energized. Thus, a voltage applied to line 74 (Fig. 4*c*) will be directed through relay contacts R101*c n/c*, R102*c n/c*, R104*c n/c*, R105*c n/c*, R107*c n/o* and R108*b n/c*, to high secondary line 83.

Due to the fact that the primary data is a special-character, relay R389 will be picked through a circuit from line 71 (Fig. 4*c*) through contacts C7, R107*f n/o* and R113*f n/o*. Hence, the test impulse applied to high secondary line 83 will be directed through contacts R389*d n/o*, and shunted past the secondary code circuits within block 77, to line 86. This, of course, is for the reason that the relative magnitude of the secondary datum with respect to the primary datum as a result of the initial comparison is high, and since the primary datum is a special-character it does not matter whether the secondary datum is or is not a special-character. The test impulse applied to high secondary line 86 is then directed through contacts R102*f n/c*, R105*f n/c*, R108*f n/c*, R111*f n/c*, R114*f n/c*, and R117*f n/o*, to high secondary output line 88.

Figure 4E:
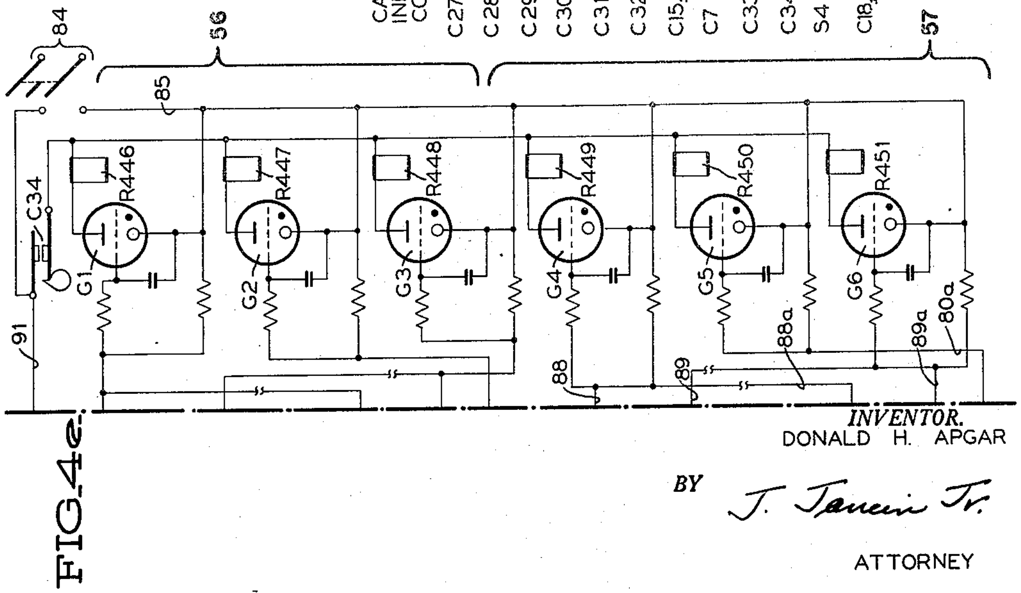

*Data compare output.*—Referring to Fig. 4*e*, a high secondary output test impulse applied to line 88 will be directed to the grid of gas tube G4, a cross-feed equal test impulse applied to line 80 will be directed to the grid of gas tube G5 via line **80*a*, and a low secondary output test impulse applied to line 89** will be directed to the grid of gas tube G6. Tubes G4–6 and relays R449—451 are represented in Fig. 2 by block 57, while tubes G1–3 and relays R446—448 are represented by block 56. The application of a positive test impulse to the grid of one of the afore-mentioned gas tubes of the OA4G type, will cause the particular tube to fire, whereupon the control relay in the plate circuit thereof will be energized. That is, a high secondary test impulse directed to the control grid of gas tube G4 will cause the control relay R449 in the plate circuit thereof, to pick via cam contacts C34. The relays R446—451, it will be understood, operate the feed clutches 59 and card distribution magnets 60 in substantially the same manner as do relays QH, QE and QL, and PL, PES and SL of the Phelps et al. Patent 2,602,544 hereinbefore referred to.

A suitable power supply represented by bracket 84 is provided for proper tube operation. Line 85 may be at a potential of −115 volts for example, whereas lines 71 and 72 may have applied thereto −40 volts and +40 volts, respectively.

As mentioned previously, the contacts common to the various control relays R446 through R451, are represented in Fig. 2 to be within block 58 and are employed to control the primary, secondary and eject feed clutches represented by block 59, and the record card magnets identified by reference number 60.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a data comparing device of the class described for determining the relative magnitude of a primary data with respect to a secondary data, wherein each of said data is arranged according to a first prescribed scale which includes data of alphabetic and numeric classes, each interspersed with data of a special character class, and within one of a plurality of classes including said alphabetic, numeric and special character classes, and wherein each of said classes is arranged according to a second prescribed scale wherein each of said classes is separately grouped; means for manifesting a primary data, means for manifesting a secondary data concurrently with said primary data, means controlled by said primary and said secondary manifesting means manifesting said primary and secondary data operable to produce an equal or unequal initial comparison result between data in any of said classes which is in accordance with the first prescribed scale and operable when alphabetic or numeric data is manifested in both primary and secondary means for manifesting to place the data also in accordance with the second prescribed scale, other means controlled by said primary and said secondary manifesting means manifesting the same primary and secondary data for modifying the initial comparison result in accordance with the second prescribed scale, and means also controlled by said manifesting means manifesting the same primary and secondary data in response to a special character for connecting said preceding means and said other means consequent upon an unequal initial comparison result to thereby produce a final relative magnitude result which is in accordance with the second prescribed scale.

2. In a data comparing device of the class described for determining the relative magnitude of data comprising data of blank, alphabetic and numeric classes, the alphabetic and numeric classes being interspersed with data of a special character class and arranged according to a first prescribed scale and within one of a plurality of classes, each of said classes being arranged according to a second prescribed scale wherein the classes are grouped separately; means for manifesting a first data; means for manifesting a second data concurrently with the first data; a first electrical circuit having an input and respective equal and unequal outputs controlled by said first and said second data manifesting means manifesting said first and said second data for producing an initial comparison result between data of any of said classes which is in accordance with the first prescribed scale and which when alphabetic or numeric data is manifested in both means for manifesting is also in accordance with the second scale; a second electrical circuit having an input and an output controlled by said first and said second data manifesting means manifesting the same first and second data for modifying in accordance with the second prescribed scale, an initial comparison result produced by said first electrical circuit when a special character or blank data is manifested by the means for manifesting the first and second data; means operable under the control of the manifesting means manifesting said first data in response to a special character being manifested for connecting the input to said second electrical circuit with the unequal output from said first electrical circuit; and means for applying a test signal to the input of said first electrical circuit, whereby said signal is caused to appear at the output of said second electrical circuit in response to an initial unequal comparison result when a special character or blank data is manifested so as to effect a final relative magnitude result in accordance with the second prescribed scale.

3. In a collator through which primary and secondary records are run to be selectively distributed to record receiving stations, such records having columns of index positions marked to represent desired data, said data being arranged according to a first prescribed scale comprising data of blank, alphabetic and numeric classes, each of the alphabetic and numeric classes being interspersed with data of a special character class, and within one of a plurality of said classes, and said classes being arranged according to a second prescribed scale wherein the classes are grouped separately; means at a secondary sensing station for sensing the records in the secondary run; means for feeding records past said secondary sensing station, one at a time to sense data on said records at the secondary station; means at a primary station for sensing the records in the primary run; means for feeding records past said primary sensing station, one at a time to sense data on said records at the primary station; primary storage relays and secondary storage relays controlled by the sensing means at the primary and secondary stations, respectively, for concurrently storing data represented on primary and secondary records; means controlled by said primary and said secondary storage relays in response to said stored data for selectively producing equal or unequal outputs in accordance with different initial comparison results of such concurrently stored data which are in accordance with the first prescribed scale and in accordance with said second scale when only numeric or alphabetic data is stored in both primary and secondary storage relays; other means controlled by said primary and said secondary storage relays in response to the same data for modifying unequal ones of said initial comparison results in accordance with the second prescribed scale only when a special character or blank data is present so as to produce final relative magnitude results which are in accordance with the second prescribed scale; means controlled by the storage relays in response to a special character for connecting said initial comparison result means and said other means consequent upon an unequal initial comparison result to produce a final relative magnitude result; and record distributing means operating under control of said other means for distributing the records in accordance to the final relative magnitude results.

4. In a collator through which primary and secondary records are run to be selectively distributed to record receiving stations, such records having columns of index positions marked to represent desired data, said data being arranged according to a first prescribed scale including data of alphabetic and numeric classes, each interspersed with data of a special character class, and within one of a plurality of said classes, and said classes being arranged according to a second prescribed scale wherein the several classes are separate; means at a secondary sensing station for sensing record data in the secondary run, one record at a time; means at a primary station for sensing record data in the primary run, one record at a time; means for feeding records past said primary and said secondary station to sense data on said records; means controlled by said primary station sensing means for manifesting a primary data; means controlled by said secondary station sensing means for concurrently manifesting a secondary data; means controlled by said primary and said secondary manifesting means in response to said manifested data for selectively producing either equal or unequal initial comparison results between data of any of said classes which are in accordance with the first prescribed scale and with the second prescribed scale when the primary and secondary data manifested is either alphabetic or numeric in both means for manifesting; other means controlled by said primary and said secondary manifesting means in response to the same data for modifying unequal ones of said initial comparison results in accordance with the second prescribed scale when a special character is stored in one of the manifesting means; and means controlled by the other of said manifesting means in response to a special character for connecting said initial equal or unequal result comparing means to said other means consequent upon an unequal initial comparison result so as to produce a final relative magnitude result which is in accordance with the second prescribed scale.

5. A collator through which primary and secondary record cards having perforate data thereon are run so as to be selectively distributed to card receiving stations, said data being arranged according to a first prescribed scale comprising data of blank, alphabetic and numeric classes, each of the alphabetic and numeric classes being interspersed with data of a special character class and within one of a plurality of said classes, and said classes being arranged according to a second prescribed scale wherein the classes are separate from each other; secondary sensing means for analyzing cards in the secondary run; means for feeding cards past said secondary sensing means, one at a time to sense data thereon; primary sensing means for analyzing cards in the primary run; means for feeding cards past said primary sensing means, one at a time to sense data thereon; means controlled by said primary sensing means for manifesting a primary data; means controlled by said secondary sensing means for concurrently manifesting a secondary data; comparing means controlled by said primary and said secondary manifesting means in response to said manifested data for selectively producing an equal or unequal initial comparison result between primary and secondary data in any one of said classes which is in accordance with the first prescribed scale and in accordance with said second scale when only alphabetic or numeric data is manifested in both manifesting means; modifying means controlled by said primary and said secondary manifesting means in response to the same data for modifying an unequal one of said initial comparison result in accordance with the second prescribed scale only when a special character or blank data is present, to thereby produce a final comparison result which is in accordance with the second prescribed scale; means selectively controlled by one of the primary and secondary manifesting means in response to a special character in the said primary or secondary data, respectively, for connecting said comparing means to said modifying means in response to an unequal initial comparison result; and record distributing means selectively operating under control of said comparing means when the initial comparison result signifies equal data, and under control of said modifying means when the initial comparison result signifies unequal data.

6. In a collator for handling primary and secondary record cards having columns of zone and numeric index positions perforated according to a combinational code to represent alphabetic or numeric or special-character data in a field of denominationally ordered columns, each character of such data having a value position in a first prescribed scale, each character of such data being arranged within one of a plurality of classes designated as blank, special-character, numeric and alphabetic, the special character class being interspersed among the alphabetic and numeric, and each of said classes being arranged according to a second prescribed scale, a numeric character being represented by a single perforation in a column in a numeric index position, the zero being represented by a single perforation in a column in a zone index position, a special-character being represented by a single perforation in a column in another zone index position or by a combinational pair of perforations in zone and numeric index positions, an alphabetic character being represented by a combinational pair of perforations in zone and numeric positions, and a blank column also having value positions within the prescribed scales; means to feed the primary and secondary cards along primary and secondary tracks, respectively; sensing means in each track for sensing one card at a time for perforated index positions; primary and secondary groups of storage relays concurrently operated under control of the primary and secondary card sensing means, respectively, to store the primary and secondary data sensed on respective cards, each group of storage relays being associated with a particular column being sensed; a supplemental relay for each denominationally ordered column operated under control of the primary group of storage relays for said column to detect special-characters in the sensed primary cards; first means controlled by the primary and secondary groups of storage relays for ascertaining an initial relative magnitude of the data, derived from the primary and secondary cards, and emitting equal or unequal signals over separate lines in conformity to the first prescribed scale of values; second means controlled by said supplemental relay and further controlled by the primary and secondary groups of storage relays in response to the same data so as to detect special-characters and blank columns in the sensed secondary cards and blank columns in the sensed primary cards, said second means modifying an unequal initial relative magnitude so as to provide a final relative magnitude of the data in conformity to the second prescribed scale of values; means controlled by the supplemental relay for connecting said first means to said second means when the initial result is unequal, and means controlled by said first means when the initial relative magnitude result indicates equal primary and secondary data, and by said second means when said initial relative magnitude result indicates unequal primary and secondary data, for governing said primary and secondary feeding means and for directing the primary and secondary cards to select card destinations.

7. In a collator through which primary and secondary records are run to be selectively distributed to record receiving stations; such records having columns of index positions marked to represent desired data; each character of such data having a value position in a first prescribed scale; each character of such data being arranged within one of a plurality of classes designated as blank, special-character, numeric and alphabetic with the special character data being interspersed among the alphabetic and numeric data; each of said classes being arranged according to a second prescribed scale with the classes being grouped separately; a numeric character being represented by a single perforation in a column in a numeric index position, the zero being represented by a single perforation in a column in a zone index position; a special-character being represented by a single perforation in a column in another zone index position, or by a combinational pair of perforations in zone and numeric index positions; an alphabetic character being represented by a combinational pair of perforations in zone and numeric positions; and a blank also having value positions within the prescribed scales; means at a secondary sensing station for sensing the records in the secondary run; means for feeding records past said secondary sensing station to sense said records, one at a time; means at a primary station for sensing the records in the primary run; means for feeding records past said primary sensing station to sense said records, one record at a time; means at a sequence station for sensing the records in the primary run as fed by said feeding means, one record at a time concurrently with the sensing of a preceding record in the primary run at the primary station; primary storage relays and secondary storage relays controlled by the sensing means in response to sensed records at the primary and secondary stations, respectively, for storing data represented in primary and secondary records; sequence relays controlled by the sensing means at the sequence station according to marked index positions in a primary record sensed at the sequence station; a supplemental relay operated under control of the primary relays in response to sensed records for detecting special-characters in the sensed primary records; primary run comparing means including a first compare circuit controlled by the primary relays and the sequence relays in response to said sensed records for providing an equal or unequal initial primary-sequence comparison result as between successive primary cards in accordance with the first prescribed scale; and a first correction circuit controlled by said supplemental relay and further controlled by the primary relays and the sequence relays in response to the same sensed records so as to detect special-characters and blank columns in the sensed sequence records and blank columns in the sensed primary records for modifying an unequal initial primary-sequence comparison result so as to provide a final primary-sequence comparison result in accordance with the second prescribed scale; means controlled by the supplemental relay for connecting said first compare circuit and said first correction circuit; dual run comparing means including a second compare circuit controlled by the primary relays and the secondary relays in response to said sensed records for providing an equal or unequal initial cross-feed comparison result as between sensed primary and secondary cards in accordance with the first prescribed scale; and a second correction circuit controlled by said supplemental relay and further controlled by the primary relays and the secondary relays in response to said sensed records so as to detect special-characters and blank columns in the sensed secondary records and blank columns in the sensed primary records for modifying an unequal initial cross-feed comparison result so as to provide a final cross-feed comparison result in accordance with the second prescribed scale; means controlled by the supplemental relay for connecting said second compare circuit and said second correction circuit; and means jointly controlled by said dual run and said primary run comparing means for selectively distributing the records of both runs to record receiving destinations.

8. In a collator according to claim 7 wherein said selective distributing means is controlled in accordance with the first prescribed scale when an initial comparison result indicates equal data and in accordance with the second prescribed scale when an initial comparison result indicates unequal data.

9. In a data comparing device of the class described for determining the relative magnitude of a primary data with respect to a secondary data, wherein each of said data is arranged according to a first prescribed scale comprising data of alphabetic and numeric classes, each interspersed with data of a special character class, and within one of a plurality of said classes, and wherein each of said classes is arranged according to a second prescribed scale with the classes separate from each other; means including storage relays each having a plurality of contacts common thereto for concurrently manifesting a primary data and a secondary data; electrical circuit means having an input and equal and unequal outputs controlled by certain contacts of said primary and said secondary data storage relays for producing at one of the outputs thereof an equal or unequal initial comparison result between said concurrently manifested data in any of said classes which is in accordance with the first prescribed scale and in accordance with the second scale when alphabetic and numeric data are manifested in both the means for manifesting; another electrical circuit means having an input and equal and unequal outputs also controlled by other contacts of said primary and said secondary data storage relays for modifying the initial comparison result in accordance with the second prescribed scale so as to produce at the output of said another electrical circuit a final relative magnitude result which is in accordance with the second prescribed scale; means controlled by the primary data storage relays in response to a special character for connecting the output of said electrical circuit to the input of said another electrical circuit; and means for applying a test impulse to the input of said electrical circuit whereby said impulse is caused to appear at the output of said another electrical circuit as a final relative magnitude result which is in accordance with the second prescribed scale when there is an unequal comparison result.

References Cited in the file of this patent

UNITED STATES PATENTS

| | | |
|---|---|---|
| 2,434,512 | Page et al. | Jan. 13, 1948 |
| 2,602,544 | Phelps et al. | July 8, 1952 |
| 2,602,545 | Luhn et al. | July 8, 1952 |